UNITED STATES PATENT OFFICE.

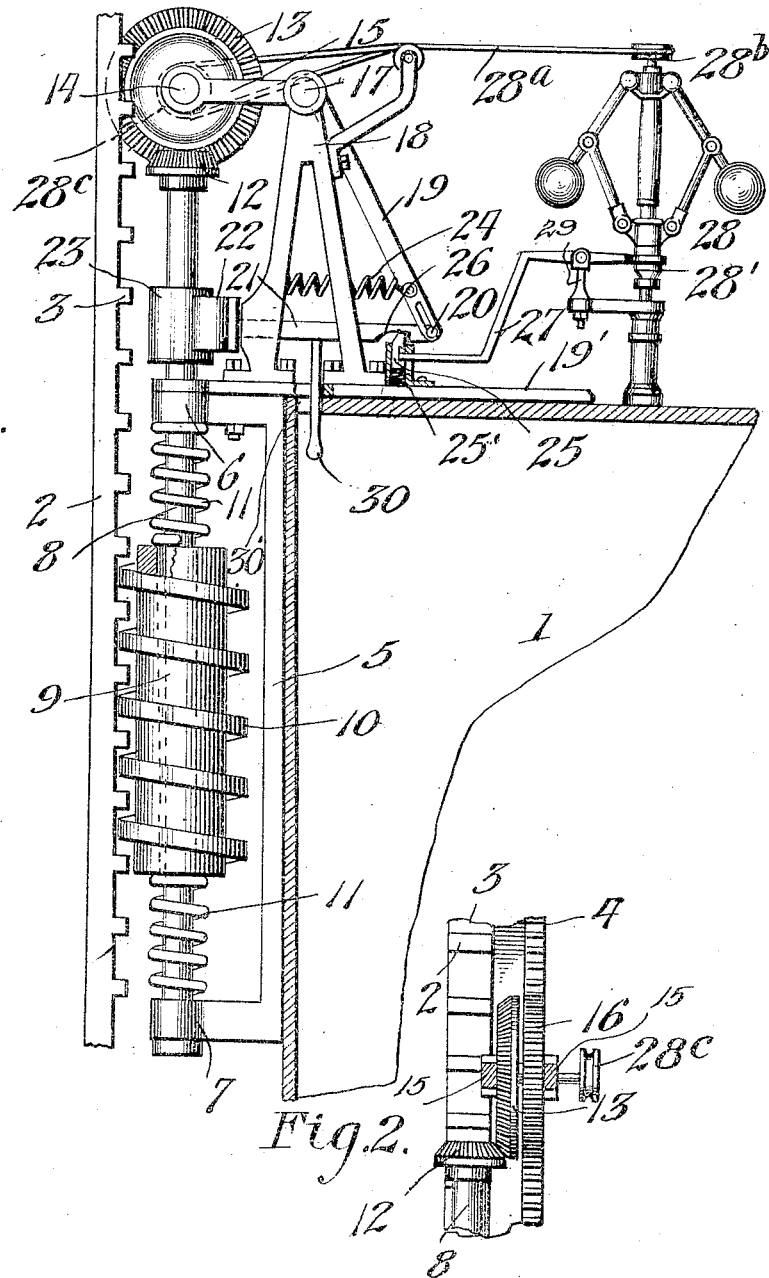

EDWARD A. WORTHINGTON, OF KIRKWOOD, MISSOURI.

BRAKE MECHANISM.

No. 832,113.  Specification of Letters Patent.  Patented Oct. 2, 1906.

Application filed September 19, 1905. Serial No. 279,145.

*To all whom it may concern:*

Be it known that I, EDWARD A. WORTHINGTON, a citizen of the United States of America, residing at Kirkwood, in the county of St. Louis and State of Missouri, have invented new and useful Improvements in Brake Mechanisms, of which the following is a specification.

This invention relates to certain new and useful improvements in brake mechanisms, and has for its object to provide an automatic brake for elevator-cars, dumb-waiters, the cars of inclined railways, and the like which will be set into action when the hoisting mechanism breaks to stop the car.

The preferred embodiment of the invention is illustrated in the accompanying drawings, in which—

Figure 1 is a view in front elevation showing the application of the device as a brake for elevator-cars, and Fig. 2 is a view looking toward the face of the rack and showing the driving-gears actuated by one of the toothed members thereof.

Referring now more particularly to the accompanying drawings, the numeral 1 designates a portion of an elevator-car, and 2 a stationary brake and gear element adapted to be fixed to the walls of the elevator-shaft and to extend from top to bottom thereof. This member 2 is provided with brake-teeth 3 and gear-teeth 4, forming stationary brake and gear elements. It is preferred in practice to form both these sets of teeth on a single rack-plate, although separate rack members may be employed.

Secured to the side of the car is a supporting-bracket 5, provided at its upper and lower ends with bearings 6 and 7, in which is journaled a vertical shaft or axle 8, carrying a revoluble brake member 9, consisting of a sleeve provided with spiral teeth 10 to coöperate with the brake-teeth 3. The element 9 constitutes, in fact, a worm which is adapted to revolve with the shaft 8 when the car is in motion, so that its spiral teeth or flange 10 will work between the brake-teeth 3 and avoid resistance to the free up-and-down movement of the car. The worm or revoluble gear element 9 is splined to the shaft or axle 8, so as to turn therewith and have a limited longitudinal motion thereon, such longitudinal motion being limited by stiff coiled cushioning-springs 11, interposed between the worm and the bearings 6 and 7.

The shaft 8 extends above the bearing 6 in the top of the car and carries at its upper end a beveled pinion 12, meshing with a beveled power-transmitting gear 13, fixedly mounted on a shaft 14, journaled in the arm of a bifurcated bracket 15. Also fixed to the shaft 14 is a driving spur-gear 16, which meshes with the rack 4 and receives continuous motion therefrom as the car moves up and down in the shaft to impart motion in one direction or the other to the shaft 8 and the revoluble member 9. It will be understood that the rotation of the revoluble member 9 holds it inactive as the car is in motion for the reason that its teeth 10 travel between the teeth of the rack 3.

The bracket 15 is connected with a rock-shaft 17, journaled in a supporting-frame 18, carried by a base 19', secured to the top of the car and to the upper end of the bracket 5, and to said shaft is also connected a rocking arm or lever 19, which projects at an inward and downward angle therefrom and is slotted at its lower end for operative engagement with a connecting-pin 20, by which it is attached to the inner end of a brake-shaft 21, slidably mounted in the frame 18 and carrying at its outer end a brake-shoe 22 to engage a brake member or drum 23, fixed to the shaft 8. It will thus be seen that upon swinging the rocking arm or lever 19 outwardly the shaft 17 will be rocked in an upward and inward direction, and will transfer corresponding movement to the bracket 15, whereby the bevel-gear 13 will be moved out of meshing engagement with the pinion 12, thus disconnecting the drive-gearing and simultaneously throwing the brake-shoe 22 in engagement with the brake member 23 to arrest the movement of the shaft 8. This operation arrests the action of the rotary gear element 9, so that the teeth 10 thereof will engage the rack-teeth 3 and form a positive brake or lock to hold the car against downward movement. When the teeth 10 come into engagement with the rack-teeth 3, shock or jar of the car by being brought to a quick stop is prevented or reduced to the minimum by the spline-and-groove connection between the shaft 8 and member 9, which will permit said member 9 to play or oscillate on said shaft, such motion being limited and cushioned by the springs 11.

The arm or lever 19 is adapted to be thrown into action by a contractile spring 24, connecting the same with the frame 18, which spring thus serves to automatically release the driving-gear 16 from engagement with the rack 4 and to throw the brake-shoe 22 into engagement with the brake member 23. In order to hold said gear 16 in engagement with the rack 4 and the shoe 22 out of engagement with the brake member 23, locking means are provided comprising a spring-catch 25, adapted to engage a notch 26, formed in the brake-shaft 21, which catch is adapted to be retracted by a trip-lever 27. When the inner end of this lever is depressed, the catch 25 will be depressed therewith and thrown out of engagement with the notch 26 against the resistance of its spring 25', and the spring 24 will thereupon act to rock the arm or lever 19, and thereby release the gear 16 and project the shoe 22 to arrest the motion of the shaft 8 and revoluble brake member 9, so as to stop the motion of the car. The trip member 27 may be operated by any suitable part of the hoisting mechanism, but is here shown as adapted to be operated by the governor 28 of such mechanism. To the sliding sleeve 28' of this governor the outer end of the lever 27 is connected, said lever being pivoted between its ends to a bracket 29. The lever will therefore be thrown into action to operate the trip member when the governor-arms are forced out by centrifugal action upon the car moving at a faster rate than its normal rate of speed. Thus, if the hoisting mechanism should break and the car begins to descend, as soon as the speed of descent passes beyond the normal rate of travel of the car the sleeve 28' will move upward and elevate the outer end and depress the lower end of the trip-lever 27, whereupon the gears 12 and 13 will be thrown out of action and the brake-shoe 22 thrown into engagement with the brake member 23 to bring the revoluble brake element 9 into operation to stop the car. The governor is driven by a belt 28ª, passing around pulleys 28ᵇ and 28ᶜ, fixed to the governor-shaft and shaft 14. In order to permit the rocker-arm 19 and the brake-shaft 21 to be retracted, an adjusting-lever 30 is provided. This lever 30 is directly attached to the brake-shaft 21 and projects downwardly through a slot 30' in the base 19' and top of the car 1. By means of this lever the brake-rod 21 may be drawn backward to retract the brake-shoe 22 and reset the parts after stoppage of the car. By means of this lever the brake mechanism may also be tripped by hand independently of the governor mechanism.

The construction and mode of use of my improved safety-brake mechanism will be readily understood from the foregoing description, taken in connection with the accompanying drawings. It will be seen that it provides a brake device which is simple in construction, positive in action, and adapted to bring the car to a complete stop upon the braking of the hoisting mechanism without undue jolts or jars and without liability of the parts of the brake apparatus being rendered inoperative.

The invention may be used upon elevator-cars, dumb-waiters, cars of inclined railways, and similar conveyances, and I therefore do not limit it to any specific application.

Having thus described the invention, what is claimed as new is—

1. In a brake for cars, the combination of a stationary rack-bar, a shaft carried by and movable with the car, means for transmitting motion to said shaft during the movement of the car, a worm-wheel carried by the shaft and adapted to rotate therewith so that its threads will work between and out of engagement with the teeth of the rack-bar, means for arresting the movement of the shaft and worm-wheel when the speed of the car passes beyond a prescribed limit to bring the threads of the worm-wheel into engagement with the teeth of the rack, and means coöperating with the brake mechanism to yieldingly limit the motion of the car at the time the brake elements are brought into engagement.

2. In a car-brake, the combination of a fixed braking element, a shaft carried by and movable with the car, a movable braking element revoluble with said shaft, said movable braking element being adapted to travel along the fixed braking element and when in motion to remain out of engagement with the same and when brought to a stop to interlock therewith, gearing for normally operating the shaft, spring-actuated means for throwing said gearing out of operation, a brake adapted to be operated by said spring-actuated means to arrest the motion of the shaft and movable member, latch mechanism for holding said spring-actuated mechanism inoperative, and means for automatically retracting said latch mechanism when the speed of the car passes its normal maximum limit.

3. In a brake for cars, the combination of a stationary brake element, a revoluble brake element, means for transmitting motion to the revoluble brake element to normally maintain it out of operative engagement with the stationary brake element, means for arresting the movement of the revoluble brake element when the speed of the car passes beyond the normal to bring said revoluble brake element into engagement with the stationary brake element, and means associated with said brake mechanism to yieldingly limit the motion of the car at the time the brake elements are brought into engagement.

4. In a brake for cars, the combination with a stationary rack-bar, a shaft carried by the car, means for transmitting motion to said shaft during the movement of the car, a worm-wheel having a feathered connection with the shaft to slide to a limited extent thereon and to rotate therewith, means for arresting movement of the shaft and worm-wheel when the speed of the car passes beyond a prescribed rate, and cushioning-springs arranged to bear against the ends of the worm-wheel to limit the sliding movement thereof to yieldingly limit the motion of the car when the wheel engages the teeth of the rack.

5. In a brake for cars, the combination of a stationary rack-bar, a shaft carried by and movable with the car, a worm-wheel carried by the shaft, gearing for operating the shaft, a brake device for engaging the shaft, operating means for arresting the action of said gearing and projecting the brake device, and means controlled by the speed of the car and for throwing said operating means into action when the speed exceeds a prescribed limit.

6. In a brake for cars, the combination of a stationary rack-bar, a shaft carried by the car, a worm-wheel carried by said shaft to coöperate with the rack-bar, gearing for operating said shaft, said gearing including a stationary gear member and a movable gear member adjustable into and out of engagement with said stationary member, a controlling device regulated in action by the speed of the car, and operating means set into action by said controlling device when the speed of the car exceeds a prescribed limit for withdrawing said movable gear member from engagement with the stationary gear member to arrest the motion of the shaft and worm.

7. In a brake for cars, the combination of a stationary rack, a shaft carried by the car, a worm-wheel carried by said shaft to coöperate with the rack, gearing for driving said shaft when the car is in motion, brake mechanism to arrest the revolution of the shaft, operating means for arresting the action of the gearing and throwing the brake device into action, means for normally holding said operating device in action, and means controlled by the speed of the car for releasing said actuating device when the speed exceeds a prescribed limit.

8. In a brake for cars, the combination of a stationary rack-bar, a shaft carried by the car, a worm carried by and revoluble with said shaft to coöperate with the rack-bar, gearing for rotating said shaft, said gearing comprising a stationary gear element and a gear-wheel movable into and out of contact with said gear element, a brake member to engage the shaft, a connection between the brake element and gear-wheel for effecting the simultaneous retraction and projection thereof, spring means for imparting motion to said connection, a detent for holding the gear-wheel normally projected and the brake device normally retracted, and a governor for retracting said detent when the speed of the car exceeds a prescribed limit.

9. In a brake mechanism for cars, the combination of a stationary rack-bar, a rotary shaft carried by the car, a worm-wheel having a feathered connection with said shaft, springs associated with the shaft and worm-wheel for cushioning the downward movement of the car when the worm-wheel engages the rack, gearing for operating the shaft including a projectable and retractable gear-wheel, a sliding brake element to engage the shaft, a spring-actuated connection between the gear-wheel and brake element to retract the former and project the latter, a spring-actuated detent for normally holding said connection inoperative, and a governor for retracting said detent when the speed of the car exceeds a prescribed limit.

10. In a brake for cars, the combination of a stationary rack-bar, a stationary gear member, a rotary shaft carried by the car, a worm-wheel carried by the shaft to coact with the rack-bar, gearing for operating said shaft, said gearing including a gear-wheel movable into and out of engagement with said stationary gear member, a rock-shaft for actuating said gear-wheel, a sliding brake device to engage the shaft, a connection between said shaft and brake device to throw the latter into action when the gear-wheel is retracted, a spring for actuating said connection, a spring-actuated detent for normally holding said connection retracted, a governor for retracting said detent when the speed of the car exceeds a prescribed limit, and means for manually resetting the parts independent of the governor.

In testimony whereof I affix my signature in presence of two witnesses.

EDWARD A. WORTHINGTON.

Witnesses:
FRED HEEGE,
AUGUST HEEGE.